United States Patent [19]

Hunt

[11] Patent Number: 4,510,210
[45] Date of Patent: Apr. 9, 1985

[54] INTERNAL-INTEGRAL SODIUM RETURN LINE FOR SODIUM HEAT ENGINE

[75] Inventor: Thomas K. Hunt, Ann Arbor, Mich.

[73] Assignee: Ford Motor Company, Dearborn, Mich.

[21] Appl. No.: 614,421

[22] Filed: May 25, 1984

[51] Int. Cl.³ .............................................. H01M 6/36
[52] U.S. Cl. ..................................... 429/11; 429/104; 429/112
[58] Field of Search ................. 429/11, 101, 102, 104, 429/112

[56] References Cited

U.S. PATENT DOCUMENTS

| 687,121 | 11/1901 | Callender . | |
|---|---|---|---|
| 1,379,854 | 5/1921 | Dinnin . | |
| 3,245,836 | 4/1966 | Agruss | 136/83 |
| 3,458,356 | 7/1969 | Kummer et al. | 136/83 |
| 3,522,101 | 7/1970 | Baker | 136/86 |
| 4,049,877 | 9/1977 | Saillant et al. | 429/11 |

Primary Examiner—Charles F. LeFevour
Attorney, Agent, or Firm—Lorraine S. Melotik; Roger L. May

[57] ABSTRACT

A thermoelectric generator device which converts heat energy to electrical energy. An alkali metal is used with a solid electrolyte and a portion of the return line for the alkali metal is located within the generator vacuum space.

6 Claims, 2 Drawing Figures

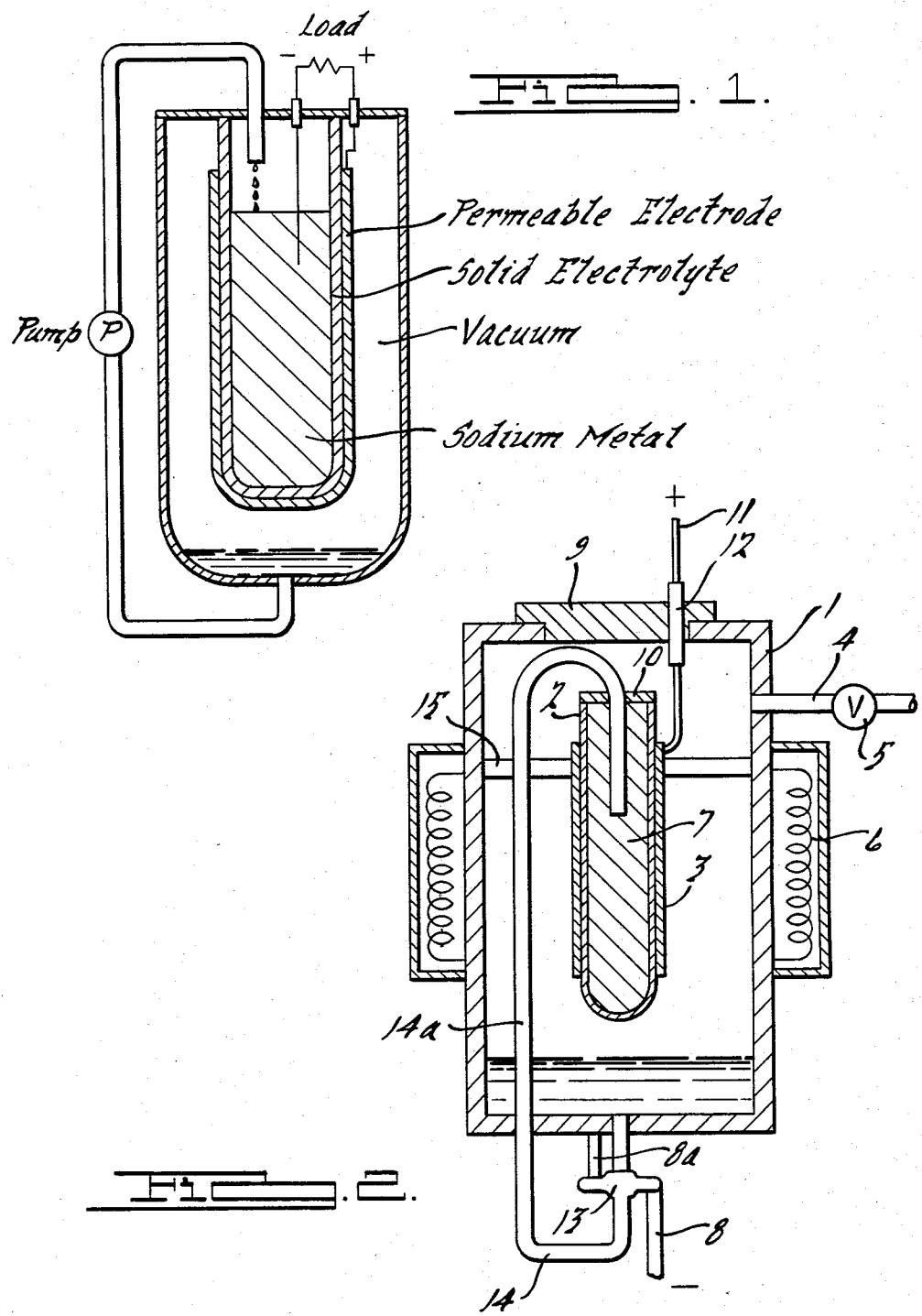

4,510,210

INTERNAL-INTEGRAL SODIUM RETURN LINE FOR SODIUM HEAT ENGINE

This invention was made under contract with or subcontract thereunder of the Department of Energy Contract Number DE-AC02-79ER10347.

This invention relates to improved thermoelectric generator devices which convert heat energy from a hear source directly to electrical energy by electrochemically expanding alkali metal, preferably sodium metal, across a solid electrolyte. More particularly, this invention relates to an improved thermoelectric generator, the improvement comprising that at least a portion of the return line for the alkali metal is located within the generator vacuum space, so that the alkali metal within this portion of the return line is maintained above its melting temperature during operation of the generator by the heat source for the generator.

BACKGROUND OF THE INVENTION

Exemplary thermoelectric generators to which the improvement of this invention applies and the principles of operation thereof have been described in U.S. Pat. Nos. 3,458,356 and 4,094,877. "Sodium heat engine" is the name commonly given to such thermoelectric generators which electrochemically expand sodium metal across a solid electrolyte. While other alkali metals may be employed in the generator of this invention, the sodium heat engine is described herein as exemplary of such generators.

The sodium heat engine generally comprises (FIG. 1) a closed container separated into a first and second reaction zone by a solid electrolyte. Liquid sodium metal is present in the first reaction zone (i.e., on one side of the solid electrolyte) and the first reaction zone is maintained during operation of the device at a pressure higher than that of the second reaction zone. In the lower pressure second reaction zone, a permeable, electrically conducting electrode is in contact with the solid electrolyte. During operation of such a device, a heat source raises the temperature of liquid sodium metal within the first reaction zone to a high temperature ($T_2$) and a corresponding high vapor pressure ($P_2$) which creates a sodium vapor pressure differential across the solid electrolyte. In response to this pressure differential, the elemental sodium gives up electrons to an electrode in contact with the sodium metal and the resulting sodium ions migrate through the solid electrolyte. The electrons having passed through an external load, neutralized sodium cations at the permeable electrode-solid electrolyte interface. Elemental sodium metal evaporates from the permeable electrode and migrates through the low pressure ($P_1$) second reaction zone (i.e., vacuum space) to a low temperature ($T_1$) condenser. The condensed liquid sodium may then be returned back to the higher temperature region within the first reaction zone, e.g., by means of a return line and an electromagnetic pump, to complete a closed cycle. Thus, during operation of the device, sodium passes from the first reaction zone to the second and, where the device includes means for pumping the sodium back to the first reaction zone, the sodium completes the cycle. The process occurring in the electrolyte and at the sodium electrolyte and electrode-electrolyte interfaces is nearly equivalent to an isothermal expansion of the alkali metal from pressure $P_2$ to $P_1$ at the temperature $T_2$. No mechanical parts need move, and the work output of the process is electrical only.

In continuous operation, the sodium heat engine requires a return line to bring the condensed sodium from the second reaction zone to the interior of the first reaction zone. The sodium in the return line must be kept above its melting point to prevent plugging of the line. Preferably, the temperature of the returning liquid sodium is sufficiently high to prevent the electrolyte from being thermally shocked by the sodium as it enters the hot first reaction zone. In previous designs, the return line has been brought to the first reaction zone by a route external to the condenser chamber as depicted in FIG. 1 of this application or FIG. 1 of U.S. Pat. No. 4,098,958. Such routing has required special measures to ensure that the temperature of the sodium within the return line is properly maintained. Heating tapes, strapping of the tubing to the exterior of the condenser, etc., have been used for this purpose. By means of this invention, heat energy present within the second reaction zone can be efficiently employed for heating the returning liquid alkali metal.

BRIEF DESCRIPTION OF THE INVENTION

The thermoelectric generator, adapted to convert heat energy from a heat source to electrical energy and to which the improvement of this invention applies, comprises: (1) means for enclosing a first reaction zone; (2) means for enclosing a second reaction zone; (3) a reaction zone separator which (a) separates and substantially completes enclosure of said first and second reaction zones; and (b) comprises a cationically conductive, solid electrolyte that is essentially impermeable to elemental alkali metal and compounds thereof and ionically conductive with respect to cations of the alkali metals; (4) elemental alkali metal within the first reaction zone and in fluid (i.e., liquid and/or vapor) communication with the solid electrolyte; (5) an electrode within the second reaction zone in electrical contact with the solid electrolyte and sufficiently permeable to permit alkali metal vapor to pass therethrough; (6) means for conducting electron flow between the elemental alkali metal within the first reaction zone and the electrode; (7) means for maintaining a temperature in the first reaction zone at least 100° C. in excess of the lowest temperature in the second reaction zone; and (8) means for returning condensed elemental alkali metal from the second reaction zone to the first reaction zone, which means comprise a return line for the condensed alkali metal and a means for pumping the condensed alkali metal through the return line.

The improvement of this invention comprises that at least a portion of the return line for the alkali metal is located within the second reaction zone, so that the portion of the return line within the second reaction zone receives sufficient heat from the heat source during operation of the generator to maintain the alkali metal within that portion of the return line at a temperature above the melting point of the alkali metal. Preferably, the temperature of the alkali metal introduced into the first reaction zone from the return line is at least sufficient to prevent thermal shock damage to the electrolyte.

By locating the alkali metal return line in the vacuum space within the generator, returning alkali metal may be efficiently heated to reach substantially the temperature of the hot, first reaction zone prior to its introduction therein. Thus, the device is protected against the inadvertent introduction of cold alkali metal into the first reaction zone, where contact of cold alkali metal with the heated electrolyte would lead to thermal shock damage to the electrolyte. Locating the return line for the alkali metal as in this invention takes advantage of the high temperature thermal radiation passing between the electrolyte and the condenser. Still further it provides easy access for internally series-connecting electrolyte elements into larger system modules.

BRIEF DESCRIPTION OF THE DRAWINGS

FIG. 1 is a schematic diagram of an exemplary thermoelectric generator to which the improvement of this invention applies. In such conventional cell, the alkali metal return line is located outside the cell.

FIG. 2 is a vertical cross sectional view of one embodiment of the improved thermoelectric generator of this invention.

DETAILED DESCRIPTION OF THE INVENTION

Exemplary thermoelectric generators to which the improvement of this invention applies are disclosed above and generally in U.S. Pat. No. 3,458,356, the disclosure of which is hereby incorporated by reference.

The device of the invention may be described by referring to FIG. 2 wherein one embodiment of the improved thermoelectric generator of this invention is shown in vertical cross section. The device is housed in a chemically resistant tube 1, e.g., stainless steel, ceramic, etc. A vacuum tight seal of tube 1 is provided by means comprising cover plate 9, which is made of stainless steel or other chemically resistant material, and thread, bolt or other conventional attaching means or sealing means such as gaskets, not shown. Positioned inside tube 1 is a smaller tube 2 which comprises the solid electrolyte. Tube 2 is filled, partially or completely, with alkali metal 7, preferably, sodium. Tube 2 is sealed by enclosure means 10 made of chemically resistant material and is held in place within tube 1 by supports made of corrosion resistant electrically insulating material, e.g., aluminum oxide. Portions of the outer surface of electrolyte tube 2 are provided with a thin electrically conductive electrode 3 which is permeable enough to permit sodium to pass therethrough and sufficiently thick and continuous to conduct electricity. Electrode 3 is shown disproportionately thick in relation to other components to facilitate its location and identification. Tube 1 is provided with an outlet conduit 4 having a valve 5. A vacuum pump, not shown, is connected to conduit 4 for reducing the pressure in tube 1.

The device also is adapted to receive heat from a heat source. Specifically, the thermoelectric generator is adapted to receive heat to maintain the temperature in tube 2 at least 100° C. in excess of the lowest temperature in tube 1. In the device shown in FIG. 2, a heater 6 is disposed about a portion of the side walls of tube 1. Alternatively, a heating device (not shown) disposed within a tube may be immersed in the alkali metal in tube 2. Other suitable means for heating are known to those skilled in the art.

Wherein it is desired that the return line act as part of the means for conducting electron flow between the elemental alkali metal in tube 2 and electrode 3, the return line contacts alkali metal 7 within tube 2. A negative lead 8 to an external circuit, not shown, is connected to pump 13, a portion of the negative lead 8a being connected to the generator wall. Alternately, a negative lead (not shown) may comprise a chemically resistant metal wire extending into molten alkali metal 7 through cap 10, which wire may extend out of the generator through cover plate 9. Positive lead 11 to the external circuit passes through an electrically insulating feedthrough 12, which extends through cover plate 9, and is in electrical contact with electrode 3. The feedthrough preferably comprises that described in concurrently filed and commonly assigned application U.S. Ser. No. 614,409. entitled "Sodium Heat Engine Electrical Feedthrough" to Neill Weber.

In operation of the device, tube 1 is evacuated by pumping means through conduit 4 to a pressure lower than about 0.1 Torr, preferably lower than about 0.001 Torr, and then sealed. Alkali metal, e.g., sodium, within tube 2 is heated to a temperature of 300° C. or greater, e.g., 300° C.–1000° C., for example, by heating portions of the sides of the thermoelectric generator in a furnace, while another portion of the generator, (e.g., the lower end of tube 1) is maintained at least 100° C. below that temperature by means such as thermal exchange with the ambient temperature air or other coolant fluids. A difference in alkali metal vapor pressure on the two sides of the electrolyte results in the creation of difference of electrical potential across the electrolyte. As electrons flow through the external circuit, alkali metal 7 passes through electrolyte 2 in the form of cations which then accept electrons from electrode 3 and return to the elemental state.

If the lower part of tube 1 is maintained at sufficiently low temperature, the alkali metal condenses there and pressure in outer tube 1 becomes the vapor pressure of the alkali metal modified by any vapor pressure drop produced by the mass flow of the alkali metal from electrode 3 to the cooler walls of tube 1. In continuous operation, the condensed alkali metal in the bottom of the generator is returned to the first reaction zone in tube 2 by means comprising return line 14. A portion 14a of the return line is located within the second reaction zone according to the improvement of this invention. Return line 14 enters the second reaction zone through the wall of tube 1, is hermetically sealed thereto, and extends through cap 10 into tube 2. An electromagnetic pump 13 is located in line 14 to pump the sodium within the return line to tube 2.

The preferred alkali metal reactant is sodium. However, potassium and other alkali metals can be used if the electrolyte separator is of compatible material. The solid electrolyte in the device of this invention may be glass, ceramic or polycrystalline ceramic material. Among the ceramic materials which may be used for such devices and which demonstrate an unusually high resistance to attack by alkali metal are beta and beta-alumina. Such materials are well known in the art and discussed in U.S. Pat. No. 4,094,877 which is herein incorporated by reference. The electrode is permeable enough to permit the alkali metal vapors to pass therethrough but of sufficient thickness to conduct electricity. It may comprise, for example, a thin conducting layer of platinum bright paint comprising platinum chloride, or molybdenum films applied by sputtering or by such means as those described in U.S. Pat. No. 4,049,877 to Saillant et al., hereby incorporated by reference.

While FIG. 2 illustrates one embodiment of the improvement of this invention, other embodiments are likewise useful. For example, the cell may include two or more electrolyte elements connected in series and/or two or more return lines located within the generator according to this invention.

IMPROVEMENT OF THE INVENTION

The improvement of this invention comprises that at least a portion of the return line is located within the second reaction zone whereby the portion of the return line within the second reaction zone receives sufficient heat from the heat source during operation of the generator to maintain tha alkali metal within that portion of return line at a temperature above the melting point of the alkali metal. Preferably, the temperature of the alkali metal introduced into the first reaction zone is at least sufficient to prevent thermal shock damage to the electrolyte.

Locating a portion of the return line within the second reaction zone offers distinct advantages described above as compared to prior art devices wherein the return line is routed external to the generator, as shown in FIG. 1.

Because of low alkali metal flow rates, this return line can be constructed of small diameter tubing. Tubing of 1/16th to ⅛th inch diameter is adequate for a cell employing, e.g., sodium and delivering a few hundred amperes. The return line may be composed of any material which is resistant to corrosion by the alkali metal employed in the generator. While return lines made of ceramic materials may be employed, it is preferable to employ return lines made of metal since metal return lines are available in small diameter and have flexibility and durability. While FIG. 2 indicates an embodiment of this invention wherein the liquid alkali metal is preferably returned to the upper end of the first reaction zone, the return line may enter the first reaction zone at any point, e.g., at the bottom. However, it is preferrable to have the return line enter the first reaction zone at the upper end since introduction of the liquid alkali metal into the upper end of this zone is aided by gravity. While in this embodiment the return line 14 preferably enters the generator through the lower generator wall near the pumping means 13, the return line may enter the generator through, e.g., the side walls. Additionally, the return line may enter and exit the generator if desired.

While it is preferable to heat the returning alkali metal to a temperature nearly that of the first reaction zone, it is not necessary to do so. The temperature of the sodium metal in the return line must be above the melting point of the sodium metal and preferably is above that which would result in thermal shock to the ceramic electrolyte. To prevent thermal shock damage to beta and beta-"alumina electrolytes, the temperature of alkali metal entering the first reaction zone should be within 200° C. of this zone and more preferably within about 100° C. of that of this zone. The return line is located within the second reaction zone so as to receive heat from the heat source, e.g., either directly by thermal radiation or by thermal conduction from the heat source, or by reflected thermal radiation within the second reaction zone. If the heat source comprises a heater disposed around a portion of tube 1 as in FIG. 2 (i.e., wherein a portion of the side walls of tube 1 are hot) the return line can parallel the length of the tube 1 and contact tube 1 or be located parallel to the tube in the vacuum space between the tube 1 and tube 2. Immersion heaters can also be employed in tube 2 to provide heat energy for the device. The immersion heaters can be closed-ended heat pipes within tube 2 as described in U.S. Pat. No. 4,098,958, which teachings are hereby incorporated by reference. In the immersion heater method of heating, the return line is preferably located near or in thermal contact with electrolyte 2. If the cell contains a central heating tube extending the length of the cell, electrolyte tube enclosed first reaction zones could be parallel arranged around such a central heating tube. The wall of tube 1 would then be relatively cool. The return lines, in this instance, would be advantageously located between the central heater tube and the electrolyte tubes. Selection of the optimal location of the return line within the second reaction zone and the optimal location of its entry into the first reaction zone according to this invention will depend, e.g., on the temperature to which it is desired to heat the returning liquid and the location of the heat source and the first reaction zone.

The invention will be further understood by referring to the following detailed examples. It should be understood that the specific examples are presented by way of illustration and not by way of limitation.

EXAMPLE 1

A sodium heat engine cell was constructed generally in accordance with FIG. 2 with 2 beta"-alumina electrolyte tubes arranged for series connection within the chamber formed by tube 1. In this example, heat was supplied from a central heater tube disposed centrally in the chamber. The heater tube was maintained at a temperature of approximately 700° C. and the condenser surface comprised the outer wall of tube 1 and was maintained at a temperature of approximately 200° C. The two electrolyte tubes were fed with sodium at the top end, using return lines comprising inconel tubes of 0.032 inch inside diameter and 0.063 inch outside diameter which were connected at their lower ends to a single, small chamber fed from an electromagnetic pump as described previously and shown (pump 13) in FIG. 2. The electrolyte tubes were approximately 30 cm in length and the return lines approximately 40 cm to provide room for assembly. The return lines were placed between the two electrolyte tubes and thus were fully exposed to the thermal radiation from the central heater wall surface. No additional heating was provided to the return lines. It was found that the sodium flow through these narrow lines was quite capable of supporting the maximum net device current of 50 amperes, corresponding to a total sodium flow of approximately 100 cm$^3$/hr.

EXAMPLE 2

A sodium heat engine cell was constructed in the end-condensed geometry shown in FIG. 2 using a single beta"-alumina electrolyte tube of 1.6 cm outer diameter and approximately 1.2 mm wall thickness. The sides of tube 1 were maintained at a temperature of 800°–900° C. by immersion in a furnace. The sodium feed line constructed of the same material used for the feed lines in Example 1 was brought through the bottom of the chamber from an electromagnetic pump and routed partially along the inner surface of the outside wall to the upper end of the electrolyte tube. The condenser surface comprises the surface of liquid sodium collected in the bottom end of the cell. This surface was maintained at a temperature of approximately 220° C. thereby establishing the temperature and vapor pressure differential required for operation of the device. In this cell, operating at higher temperatures than the cell in Example 1, the sodium return lines can be efficiently coupled thermally ro the heated surface and thus accomplish the preheating of the incoming sodium to a temperature sufficiently close to the sodium in the hot zone within the electrolyte tube so that inadvertant thermal shock problems due to admission of cold sodium are avoided.

In view of this disclosure, many modifications of this invention will be apparent to those skilled in the art. It is intended that all such modifications which fall within the true scope of the invention will be included within the terms of the appended claims.

I claim:

1. In a thermoelectric generator adapted to convert heat energy from a heat source to electrical energy and which comprises:
   (1) means for enclosing a first reaction zone;
   (2) means for enclosing a second reaction zone;
   (3) a reaction zone separator which:
      (a) separates and substantially completes enclosure of said first reaction zone and said second reaction zone, and
      (b) comprises a cationically conductive, solid electrolyte that is essentially impermeable to elemental alkali metal and compounds thereof and ionically conductive with respect to cations of said alkali metals;
   (4) elemental alkali metal within said first reaction zone and in fluid communication with said solid electrolyte;
   (5) an electrode within said second reaction zone in electrical contact with said solid electrolyte and sufficiently permeable to permit alkali metal to pass therethrough;
   (6) means for conducting electron flow between the elemental alkali metal within the first reaction zone and the electrode;
   (7) means for maintaining a temperature in said first reaction zone at least 100° C. in excess of the lowest temperature in said second reaction zone; and
   (8) means for returning condensed elemental alkali metal from said second reaction zone to said first reaction zone, which means comprise a return line for said condensed alkali metal and a means for pumping said condensed alkali metal through said return line;

the improvement comprising that at least a portion of said return line is located within said second reaction zone, so that said portion of said return line receives sufficient heat from the heat source during operation of said generator to maintain said alkali metal within said portion of said return line at a temperature above the melting point of said alkali metal.

2. A thermoelectric generator according to claim 1, wherein the temperature of said alkali metal introduced into said first reaction zone is at least sufficient to prevent thermal shock damage to said electrolyte.

3. A thermoelectric generator according to claim 1, wherein said portion of said return line within said second reaction zone comprises metal.

4. A thermoelectric generator according to claim 1, wherein said return line enters said first reaction zone near the top of said first reaction zone.

5. A thermoelectric generator according to claim 1, wherein a major portion of the length of said return line is located within said second reaction zone.

6. A thermoelectric generator according to claim 1, wherein said return line enters said second reaction zone at the bottom end of the generator.

* * * * *